US010262011B2

(12) United States Patent
Simeoni et al.

(10) Patent No.: US 10,262,011 B2
(45) Date of Patent: Apr. 16, 2019

(54) METHOD FOR ACCESSING INFORMATION RELATED TO AN ENTITY

(75) Inventors: Rossana Simeoni, Turin (IT); Dario Mana, Turin (IT); Fabrizio Antonelli, Turin (IT); Vincenzo Cuciti, Turin (IT); Luca Console, Turin (IT); Ilaria Lombardi, Turin (IT); Fabiana Vernero, Turin (IT); Monica Perrero, Turin (IT)

(73) Assignee: Telecom Italia S.p.A., Milan (IT)

( * ) Notice: Subject to any disclaimer, the term of this patent is extended or adjusted under 35 U.S.C. 154(b) by 826 days.

(21) Appl. No.: 13/880,682

(22) PCT Filed: Oct. 21, 2010

(86) PCT No.: PCT/IT2010/000425
§ 371 (c)(1),
(2), (4) Date: Apr. 19, 2013

(87) PCT Pub. No.: WO2012/053019
PCT Pub. Date: Apr. 26, 2012

(65) Prior Publication Data
US 2013/0212102 A1 Aug. 15, 2013

(51) Int. Cl.
*G06F 17/30* (2006.01)
*G06F 3/0482* (2013.01)
*G06F 3/0488* (2013.01)

(52) U.S. Cl.
CPC ...... *G06F 17/30283* (2013.01); *G06F 3/0482* (2013.01); *G06F 3/04886* (2013.01); *G06F 17/30994* (2013.01)

(58) Field of Classification Search
None
See application file for complete search history.

(56) References Cited

U.S. PATENT DOCUMENTS

| 5,874,954 A | * | 2/1999 | Kilmer | G06F 3/0219 707/E17.111 |
| 2002/0185532 A1 | * | 12/2002 | Berquist | G07G 1/0045 235/385 |

(Continued)

FOREIGN PATENT DOCUMENTS

WO 2007/099390 A1 9/2007

OTHER PUBLICATIONS

International Search Report and Written Opinion dated Jun. 30, 2011, PCT/IT2010/000425.

(Continued)

*Primary Examiner* — Charles D Adams
(74) *Attorney, Agent, or Firm* — Banner & Witcoff, Ltd.

(57) ABSTRACT

A method accesses information related to a reference entity through a display device. The method includes providing an ontology describing the reference entity and entities, the reference entity and the entities being classes of the ontology or being arranged into classes, the classes having respective properties; receiving information for identifying the reference entity; and calculating a network of entities out of the entities, the entities having relationships with the reference entity, according to the properties. The method further includes identifying portions available on an area of the display device, according to the classes of the ontology; assigning the entities to at least one of the display area portions; selecting a display area portion out of the display area portions; and displaying, on the display device, images and/or text data for indicating at least part of the entities of the network assigned to the selected display area portion.

19 Claims, 14 Drawing Sheets

(56) References Cited

U.S. PATENT DOCUMENTS

| | | | | |
|---|---|---|---|---|
| 2006/0164409 A1* | 7/2006 | Borchardt | ........... | G06F 3/04815 |
| | | | | 345/419 |
| 2006/0271526 A1* | 11/2006 | Charnock | .............. | G06Q 30/02 |
| 2009/0228353 A1* | 9/2009 | Achan | ............... | G06F 17/30648 |
| | | | | 705/14.53 |
| 2011/0167054 A1* | 7/2011 | Bailey | ............... | G06F 17/30864 |
| | | | | 707/710 |
| 2011/0202886 A1* | 8/2011 | Deolalikar | ........ | G06F 17/30707 |
| | | | | 715/853 |
| 2011/0264656 A1* | 10/2011 | Dumais | ............... | G06F 17/3087 |
| | | | | 707/728 |
| 2012/0054226 A1* | 3/2012 | Cao | ................... | G06F 17/30941 |
| | | | | 707/769 |

OTHER PUBLICATIONS

Francesca Carmagnola et al., "Tag-based user modeling for social multi-device adaptive guides", User Modeling and User-Adapted Interaction, Vo 18 Issue 5, Jul. 29, 2008, pp. 497-538, XP019650064 ISSN: 0924-1868, DOI: 10.1007/S11257-008-9052-2.

* cited by examiner

METHOD FOR ACCESSING INFORMATION RELATED TO AN ENTITY

CROSS REFERENCE TO RELATED APPLICATIONS

This is a U.S. National Phase Application under 35 U.S.C. § 371 of International Application No. PCT/IT2010/000425, filed Oct. 21, 2010, which was published Under PCT Article 21(2), the entire contents of which are incorporated herein by reference.

TECHNICAL FIELD OF THE INVENTION

The present invention generally relates to the field of management of huge amount of information contents. More in particular, the present invention concerns a method for accessing information related to an entity through a display device, such as the screen of a mobile phone.

PRIOR ART

In the field of management of huge amount of information conent, a domain is a topic area which is represented by an ontology (also referred as taxonomy). An ontology is a hierarchical structure comprising nodes, each one representing a concept of the domain, and comprising links (referred to as arcs) between the nodes, each link representing an asymmetrical relationship between the nodes. The objects of an ontology are arranged into classes having respective properties. An ontology can be represented by an acyclic interconnected graph, which is a graph wherein all the nodes are connected through at least one arc and there are no cycles.

Typically, an ontology is written in a formal language such as XML (eXtensible Markup Language) or one of its extensions like RDF (Resource Description Framework) or OWL (Web Ontology Language).

TouchGraph (www.touchgraph.com) is a tool that explores connections between different websites.

Liveplasma (www.liveplasma.com) is a search engine for music, which displays on the screen of a personal computer a map of artists or bands which are related (for example, similar genre) to a searched artist or band.

WO 2007/099390 discloses an improved user interface for a portable electronic device that incorporates contextual navigation information with filter criteria to enable users to navigate through fewer views to achieve desired search results. The user interface enables a user to perform a search/filter by selecting a first level filter criterion and a contextual navigation filter criterion from the same view. A third data set is displayed when the filter is applied, thereby allowing the user to jump from a first level view to a third level view.

SUMMARY OF THE INVENTION

The Applicant has observed that the prior art solutions do not allow the huge amount of related information content to be accessed in a simple way through a display device with a limited area (such as the display of a mobile phone) and with limited possibilities of interaction between the user and the display device.

The present invention relates to a method for accessing information related to a reference entity and to a reference user as defined herein.

The Applicant has recognized that the method according to the present invention allows to access in a simple way to a huge amount of information content related to a reference entity and described by one or more ontologies through a display device having a limited area (such as the screen of a mobile phone), also in case of a limited interaction possibility between the user and the display device.

Moreover, the method according to the present invention allows to access information generated by some actions performed by a plurality of users on the entities of the ontology and also information generated by actions performed between the users themselves.

According to another aspect, the present invention provides a system as defined in the enclosed claims 15 and 16.

According to still another aspect, the present invention provides a computer program product as defined in the enclosed claim 17.

According to still another aspect, the present invention provides a mobile phone as defined in the enclosed claim 18 and its preferred embodiment as defined in the dependent claim 19.

DETAILED DESCRIPTION

For the purposes of the present invention, it is defined "entity" $o_i$ an instance in an ontology A or a class $C_i$ of the ontology A, wherein the instance (or the class) in the ontology can describe an existing object (i.e. a product) or can describe a person or people. For example, the field of enogastronomy is described by a ontology A including the entity $o_i$, which can be the name of a specific wine (for example, "Roero Arneis") or can be the name of a person producing (or selling) this wine (for example, "Pino Costalunga"). In the same example of enogastronomy, the classes can indicate for example the products (i.e. food, wine), restaurants, companies producing (or selling) the products, cooks, recipes.

Figure 1A:
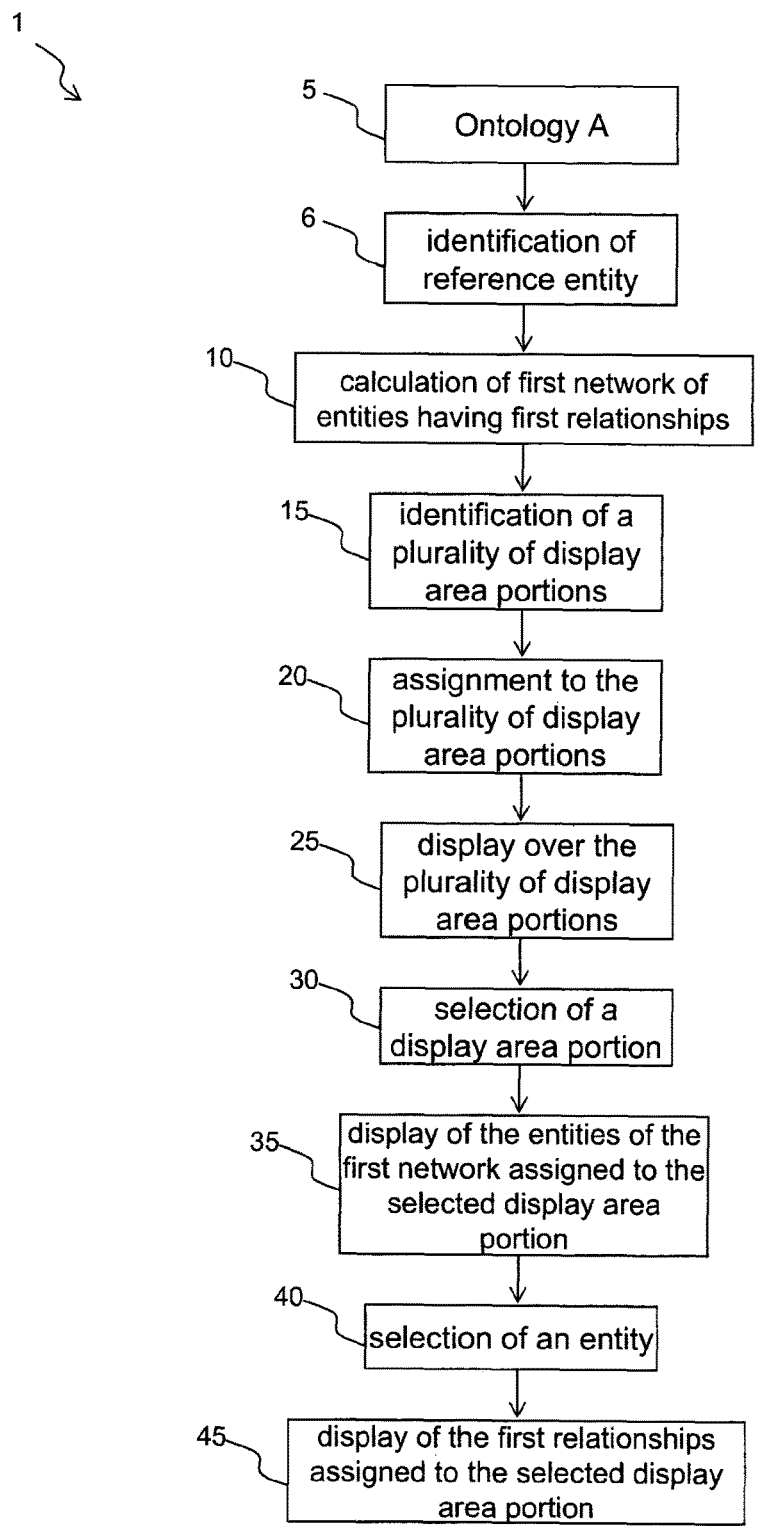
FIGS. 1*a-d* schematically show flowcharts of the method for accessing information related to a reference entity according to first, second, third and fourth embodiments the invention.

Referring to FIG. 1*a*, it shows schematically the flowchart of the method 1 for accessing information related to a reference entity according to a first embodiment of the invention.

The method 1 includes steps 5, 6, 10, 15, 20, 25, 30, 35, 40, 45.

Figure 3A:
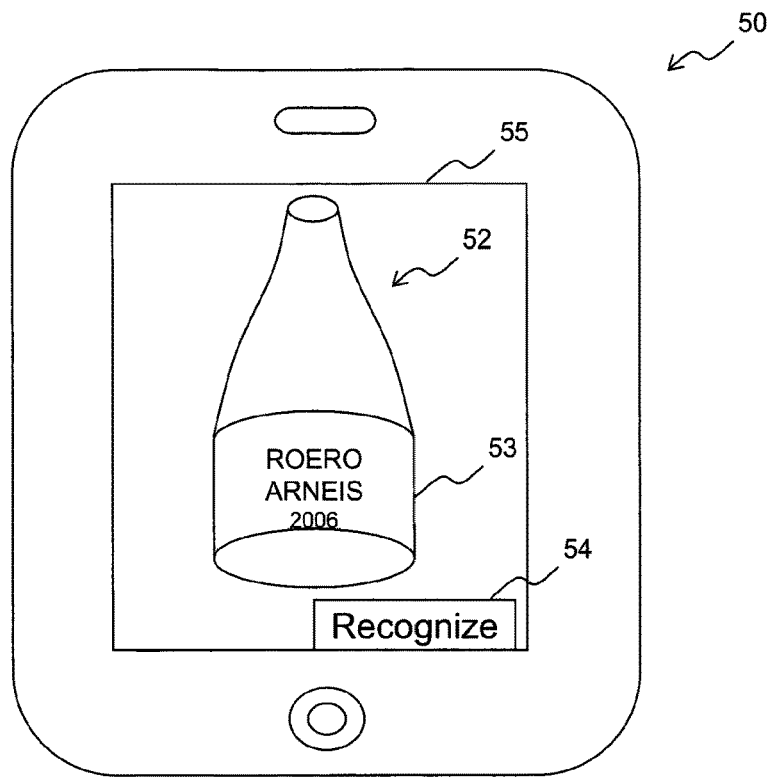
FIG. 3*a* schematically shows a mobile phone for performing the methods according to the invention.
Figure 3B:
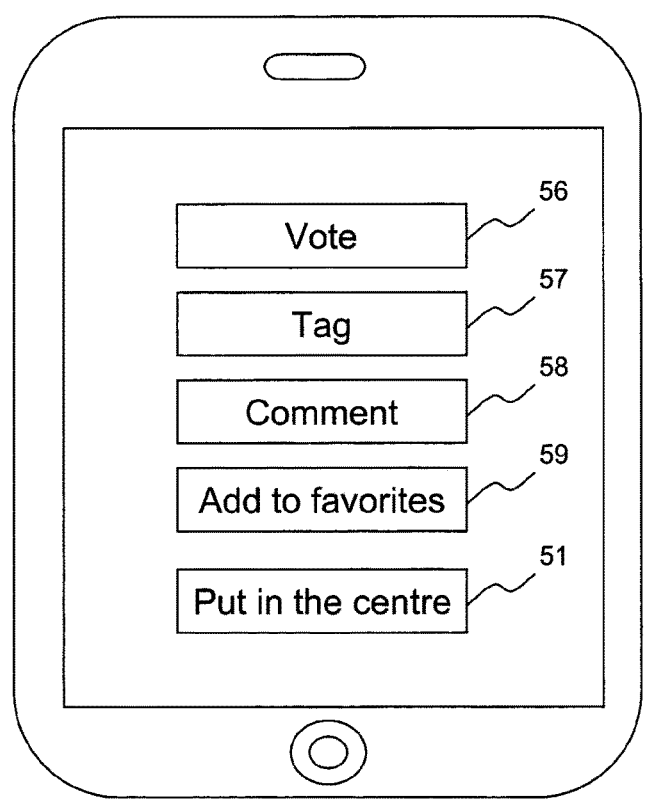
FIG. 3*b* schematically shows some actions which can be performed by a user of the mobile phone according to the invention.

The method 1 is performed by means of a display device, such as the screen 55 of a mobile phone 50, as shown in FIG. 3*a*.

Step 5 includes providing an ontology A which describes a first plurality of entities $O=\{o_1, o_2, \ldots o_m\}$, wherein $o_i$ (i=1, 2, ... m) is a generic entity belonging to the ontology A. The first plurality of entities O are a plurality of classes C of the ontology A or are instances of the ontology arranged into the plurality of classes C, wherein the plurality of classes have respective properties. The ontology A is stored for example into a memory of server equipment. Preferably, the ontology A is arranged into a database, typically a relational database.

Referring to the example in the field of enogastronomy, the ontology A describes the enogastronomy field, the first plurality of entities O are for example specific types of wines or cheese or the name of companies producing (or selling) a specific wine or cheese, while the plurality of classes are wine and cheese. The properties of the class wine can be the type of grapes used for the production of the wine or the time required for the maturation of the wine; the properties of the class cheese can be the type of milk used for the production of the cheese or the time required for the maturation of the cheese.

Step 6 includes the reception of information for identifying an entity $o_R$ out of the first plurality of entities O: this entity is referred as "reference entity". The reference entity $o_R$ can be any one of the first plurality of entities O included in the ontology A and is indicated as reference entity only for the purpose of explaining the invention.

Referring to the example in the field of enogastronomy, the reference entity $o_R$ is identified for example from a visual search by means of the mobile phone 50 equipped with a camera and performed on the label 53 of a bottle of wine 52, as shown in FIG. 3*a*: in this example, the reference entity $o_R$ is a specific wine named "Roero Arneis".

The invention is not limited to the visual search used for the identification of the reference entity, because other solutions can be used in order to identify the reference entity $o_R$, such as:
- a recognition of a RFID (Radio-Frequency Identification) on the bottle of wine by means of the mobile phone equipped with an RFID reader;
- a text search with a keyword;
- a random choice.

Step 10 includes the calculation of a first network of entities selected from the first plurality of entities O, wherein the entities of the first network have first relationships with the reference entity $o_R$, according to the properties of the classes. Said calculation can be referred as $Net(o_R, o_i, type=A)$, wherein Net is a function performing the calculation, $o_R$ is the reference entity, $o_i$ (i=1, 2, ... m) is a generic entity (different from the reference entity $o_R$) defined in the ontology A, type indicates the type of calculated first relationships and type=A indicates that the type of calculated first relationships between the reference entity $o_R$ and a generic entity $o_i$ is based on the ontology A (i.e., on the classes properties).

Preferably, step 10 includes the calculation of entities of the first network having first relationships with each other.

Therefore for the purposes of the first embodiment of the present invention, the first network of entities is a plurality of entities connected by a set of links and having different types of semantic relationships, wherein the semantic relationships are calculated taking into account the properties of the classes.

Specifically, the following first relationships between the reference entity $o_R$ and a generic entity $o_i$ defined in the ontology A can be calculated, according to the properties of the classes of the ontology A:
- $o_R$ and $o_i$ belong to different classes $C_1$ and $C_2$ respectively having a common property. In the example in the field of enogastronomy, $o_R$ and $o_i$ have a same company producing them, or $o_R$ and $o_i$ have the same features of production or for aging.
- $o_R$ is the value of a property of $o_i$, or vice versa. In the example in the field of enogastronomy, $o_R$ is a company producing $o_i$ (or vice versa) or $o_R$ is an ingredient for $o_i$ (or vice versa).
- $o_R$ and $o_i$ belong to the same class or belong to adjacent classes, wherein adjacency is determined according to the hierarchical structure of the ontology. In the example in the field of enogastronomy, $o_R$ and $o_i$ are both fresh cheese.

Therefore step 10 generates the first network of entities, which includes at least part of the plurality of entities O defined in the ontology A having a relationship with the reference entity $o_R$, according to the properties of the classes. For example, the first plurality of entities is $O=\{o_R, o_1, o_2, o_3, o_4, o_5, o_6, o_7, o_8, o_9, o_{10}\}$ and the first network of entities having a relationship with the reference entity $o_R$ is composed of the following entities: $o_2, o_4, o_5, o_8, o_9, o_{10}$. Moreover, step 10 generates a list of said first relationships with the reference entity $o_R$. In the above example, the following first relationships (indicated with $r_i$, i=1 ... 10) are generated: relationship $r_2$ between $o_R$ and $o_2$, relationship $r_4$ between $o_R$ and $o_4$, relationship $r_5$ between $o_R$ and $o_5$, relationship $r_8$ between $o_R$ and $o_8$, relationship $r_9$ between $o_R$ and $o_9$, relationship $r_{10}$ between $o_R$ and $o_{10}$.

Step 15 includes the identification of a plurality of portions available on the area of the display device, according to the plurality of classes of the ontology.

Figure 4A:
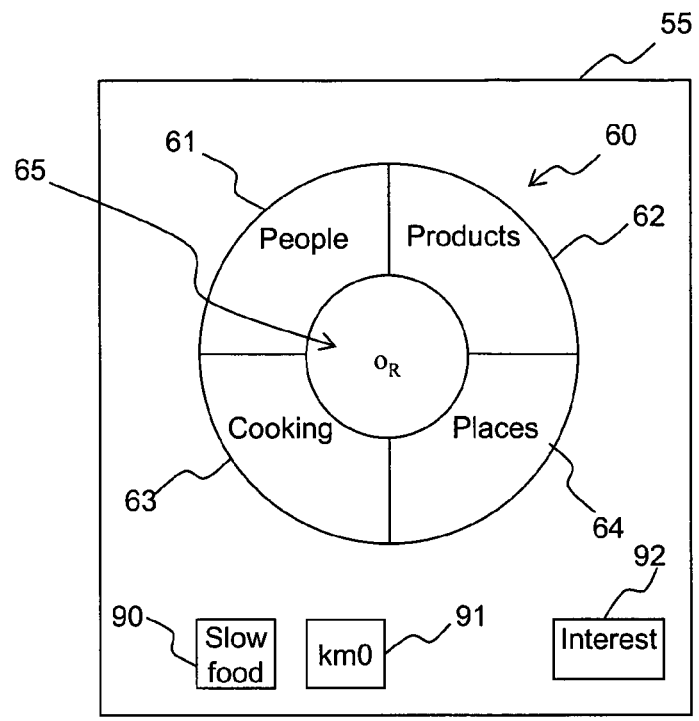
FIGS. 4*a-h* schematically show the screen of a mobile phone when performing the steps of the method according to the invention.

Referring to FIG. 4*a*, the method 1 identifies four portions 61, 62, 63, 64 on the screen 55 of the mobile phone 50, according to the classes defined in the ontology A.

Moreover, different text data (and, preferably, different images) are displayed over the four portions 61, 62, 63, 64 for identifying them. In the example in the field of enogastronomy, the text data displayed over the four portions 61, 62, 63, 64 respectively can be the following: People, Products, Cooking, Places. The meaning of the text data or of the images displayed over the four portions 61, 62, 63, 64 is associated to the entities which are assigned (by next step 20) within a selected portion.

Step 20 includes the assignment of the entities of the first network and corresponding first relationships to at least one of the plurality of display area portions.

Referring to the above example of $O=\{o_R, o_1, o_2, o_3, o_4, o_5, o_6, o_7, o_8, o_8, o_9, o_{10}\}$, entity $o_2$ and corresponding relationship $r_2$ is assigned to portion 62 identified by Products, entity $o_4$ and corresponding relationship $r_4$ is assigned to portion 64 identified by Places, entity $o_5$ and corresponding relationship $r_5$ is assigned to portion 62 identified by Products, entity $o_8$ and corresponding relationship $r_8$ is assigned to portion 63 identified by Cooking, entity $o_9$ and corresponding relationship $r_9$ is assigned to portion 62 identified by Products, entity $o_{10}$ and corresponding relationship $r_{10}$ is assigned to portion 61 identified by People.

The assignment of the entities of the first network to at least one of the display area portions 61, 62, 63, 64 depends on the meaning of the text data or of the images displayed over the four portions 61, 62, 63, 64. In the example in the enogastronomy field with wine Roero Arneis as reference entity, entity $o_2$ is assigned to portion 62 identified by Products because $o_2$ relates to a product (for example, $o_2$ is a specific wine, such as "Grignolino", which is a product like wine Roero Arneis), entity $o_4$ is assigned to portion 64 identified by Places because $o_4$ relates to a place (for example, $o_4$ is the name of a country, such as Italy, wherein wine Roero Arneis is produced), entity $o_8$ is assigned to portion 63 identified by Cooking because the $o_8$ relates to cooking (for example, $o_8$ is the name of a first course which is well combined with wine Roero Arneis) and entity $o_{10}$ is assigned to portion 61 identified by People because $o_{10}$ relates to People (for example, $o_{10}$ is the name of a famous person producing or selling wine Roero Arneis).

Step 25 includes the display of a plurality of text data and/or images over the plurality of display area portions. This is shown in FIG. 4a, wherein in the example in the enogastronomy field text data People is displayed over the portion 61, text data Products is displayed over the portion 62, text data Cooking is displayed over the portion 63 and text data Places is displayed over the portion 64.

Step 30 includes the selection of a display area portion selected from the plurality of display area portions.

Referring to the example in the enogastronomy field, the user of the mobile phone 50 selects portion 62 because he/she is interested to access information regarding Products having a semantic relationship with the wine Roero Arneis.

Step 35 includes the display, over the display device, of a plurality of images and/or text data for indicating at least part of the entities of the first network assigned to the selected display area portion.

Figure 4B:
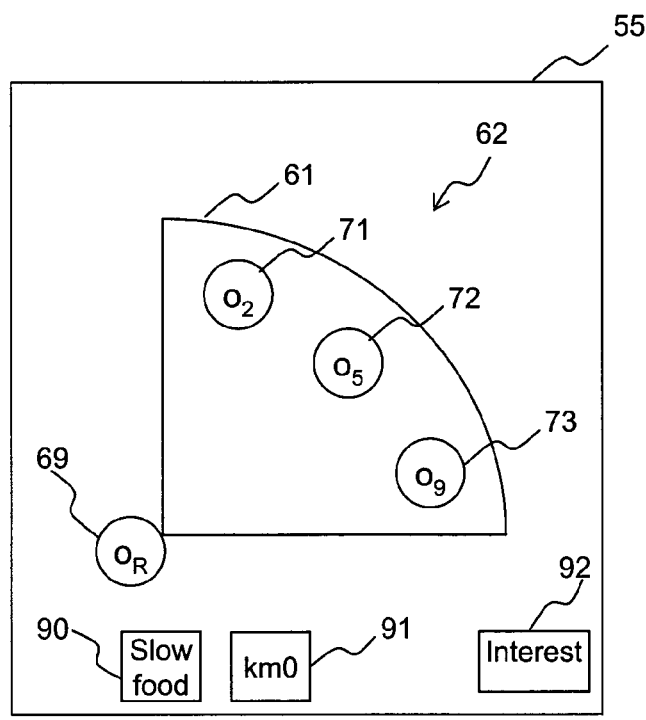

Referring to FIG. 4b and to the example in the enogastronomy field, the user of the mobile phone 50 has selected the portion 62 identified by text data Products and the screen 55 of the mobile phone 50 displays images 71, 72, 73 indicating the entities $o_2$, $o_5$, $o_9$ respectively, which were assigned (in step 20) to the portion 62. For example, the image 71 is a small bottle of wine Grignolino, the image 72 is a small bottle of wine Moscato and the image 73 is the cheese "Grana Padano" (which is supposed to be well combined with the wine Roero Arneis).

Step 40 includes the selection of an entity selected from the first network of entities. Referring to FIG. 4e, the selected entity is $o_5$, which is a circle with a bold line.

Step 45 includes the display of at least one text data and/or image describing at least one of the first relationships assigned to the selected display area portion. This is shown in FIG. 4e, which shows an area 70 displaying the first relationships $r_5$, $r_i$, $r_j$. Referring to the example in the field of enogastronomy and in case the user has selected the image 72 representing a bottle of wine Moscato, the screen 55 of the mobile phone 50 displays the following first relationships $r_5$, $r_i$, $r_j$ as text data: "is similar to", "is produced by", "is served by".

Figure 1B:
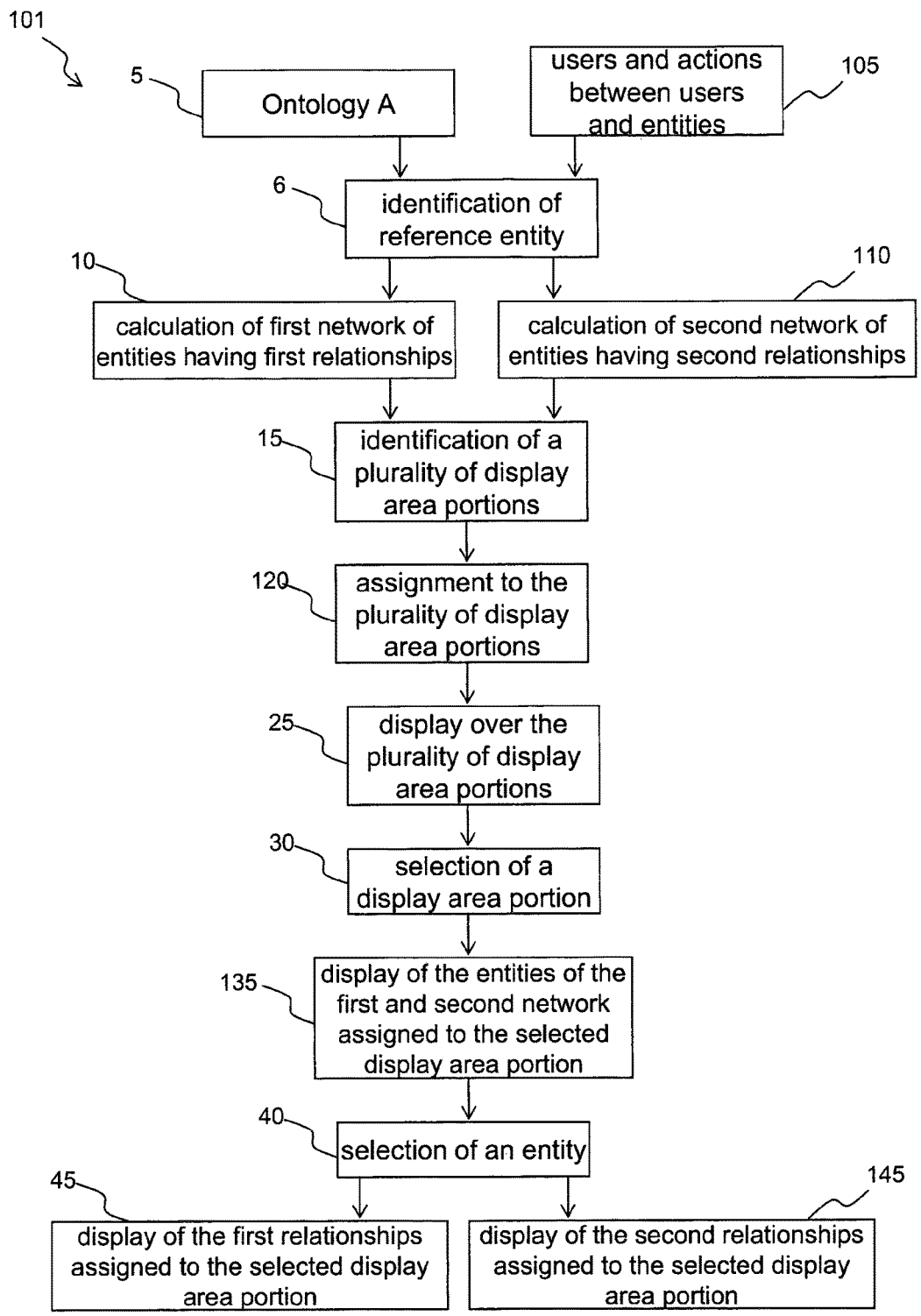

Referring to FIG. 1b, it shows schematically the flowchart of a method 101 for accessing information related to the reference entity according to a second embodiment of the invention, wherein steps with the same function as the first embodiment are indicated with the same reference numbers.

The method 101 includes steps 5, 105, 6, 10, 110, 15, 120, 25, 30, 135, 40, 45, 145.

The method 101 is performed by means of a display device, such as the screen 55 of a mobile phone 50, as shown in FIG. 3a.

The method 101 differs from the method 1 in the steps 105, 110, 120, 135, 145.

Step 105 includes providing a plurality of users U={$u_1$, $u_2$, . . . $u_n$} and at least one action between the plurality of users U and the reference entity $o_R$ and between the plurality of users U and the plurality of entities O of the ontology A.

For the purposes of the present invention, the plurality of users U is a group of people which are interested to access the information related to the reference entity $o_R$ and related to the plurality of entities O (and, preferably, also access information related to other users, as it will be explained more in detail afterwards), by means of a display device 55.

Figure 6A:
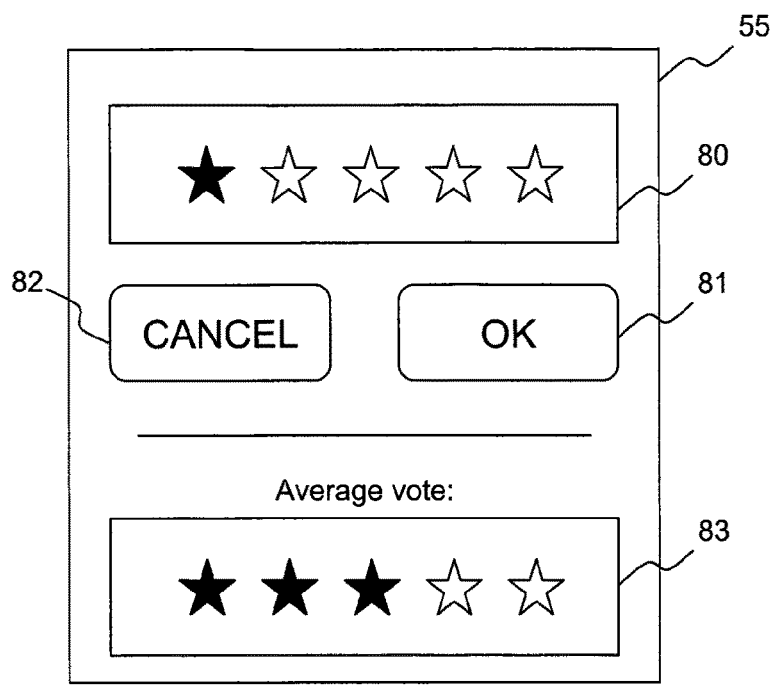
FIGS. 6*a-d* schematically show more in detail some actions which can be performed by a user of the mobile phone according to the invention.
Figure 6B:
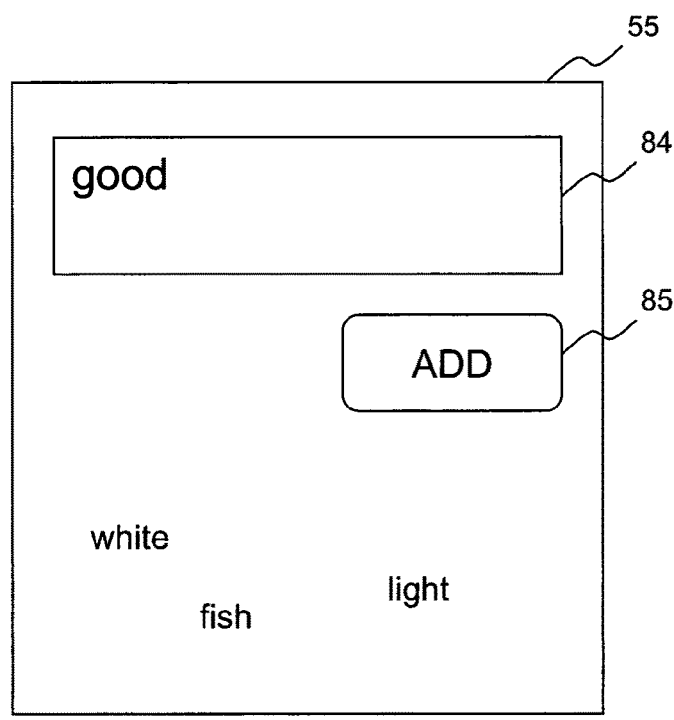
Figure 6C:
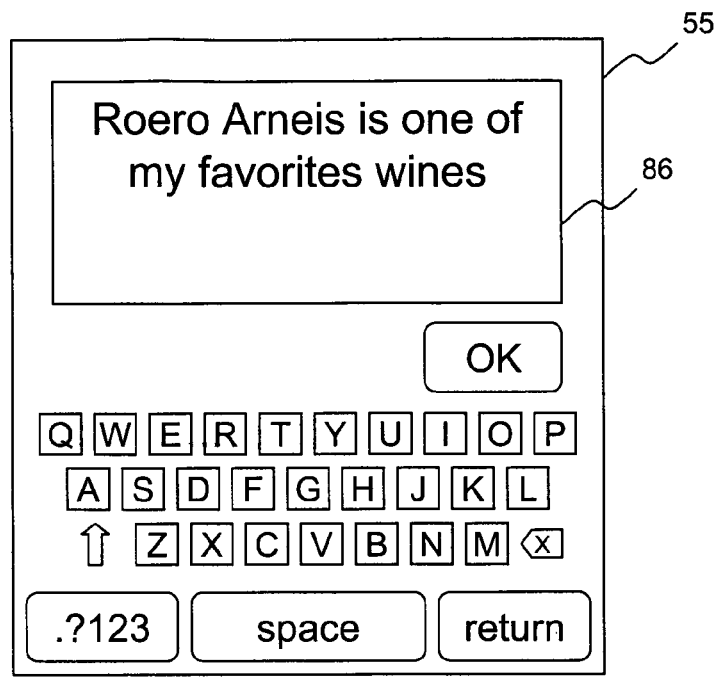
Figure 6D:
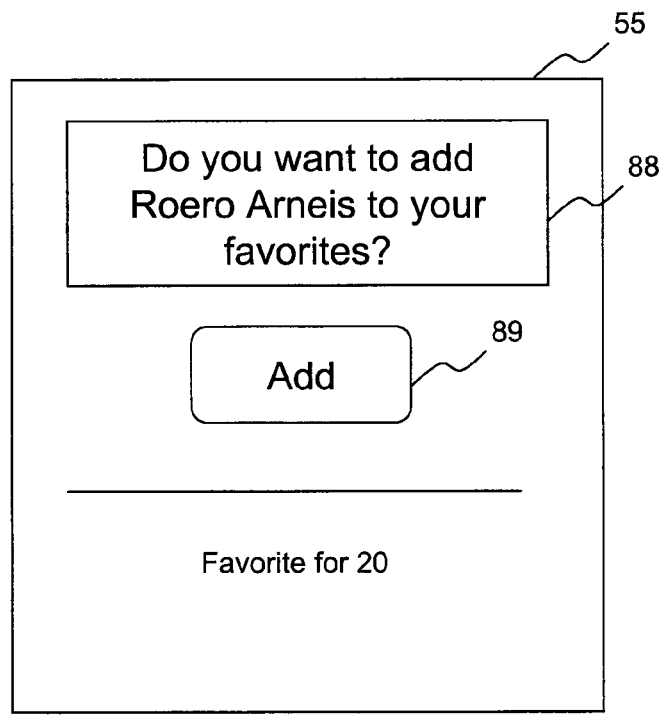

The following is a list of possible actions which can be performed by a generic user $u_i$ of the plurality of users U:
Vote: the user $u_i$ assigns a vote to the reference entity $o_R$, wherein the vote is a number comprised in a range between zero and a maximum value (for example, 5), as shown in FIG. 6a;
Tag: the user $u_i$ assigns a tag to the reference entity $o_R$, as shown in FIG. 6b;
Comment: the user $u_i$ assigns some comments to the reference entity $o_R$, as shown in FIG. 6c;
Add to Favorites: the user $u_i$ assigns the reference entity $o_R$ to the list of his favorites entities, as shown in FIG. 6d.

Moreover, the user can decide to put the reference entity $o_R$ in the center of the display device, in order to access information related to the reference entity $o_R$: this is achieved with steps 30, 35, 40, 45 of the method 1 according to the first embodiment of the invention and with the steps 30, 135, 40, 145 of the method 101 according to the second embodiment of the invention, as will be explained more in detail afterwards.

The invention is not limited to the above indicated user actions: other possible user actions can be defined, depending on the possible behavior of the users and, preferably, depending on the field of the considered ontology A.

Step 110 includes the calculation of a second network of entities having second relationships with the reference entity $o_R$ (and, preferably, each other), according to said actions. Said calculation can be referred as Net($o_R$, $o_i$, type=Actions), wherein type=Actions indicates that the type of calculated second relationships between the reference entity $o_R$ and a generic entity $o_i$ is based on the users actions.

Specifically, the following second relationships between the reference entity $o_R$ and a generic entity $o_i$ of the ontology A can be calculated, according to the actions performed by the users:
the tag of $o_R$ and the tag of $o_i$ have at least one common word, preferably a plurality N of common words, wherein the value of N is pre-defined and can be changed by configuration;
$o_R$ is mentioned as tag of $o_i$, or vice versa;
$o_R$ is mentioned in the comments for $o_i$, or vice versa;
$o_R$ and $o_i$ belong to the Favorites of at least one user, preferably of a plurality M of users, wherein the value of M is pre-defined and can be changed by configuration;
$o_R$ and $o_i$ belong to the list of tags of a plurality $K_1$ of users, wherein the value of $K_1$ is pre-defined and can be changed by configuration;
$o_R$ and $o_i$ belong to the comments of a plurality $K_2$ of users, wherein the value of $K_2$ is pre-defined and can be changed by configuration;
$o_R$ and $o_i$ were voted by a plurality $K_3$ of users, wherein the value of $K_3$ is pre-defined and can be changed by configuration;
$o_R$ and $o_i$ were accessed recently by a plurality $K_4$ of users, wherein the value of $K_4$ is pre-defined and can be changed by configuration.

Similar considerations can apply also to classes. That is, the second relationships can be calculated also between classes, according to the actions performed by the users.

Therefore for the purpose of the second embodiment of the present, the second network of entities is a plurality of entities connected by a set of links and having different types of semantic relationships, wherein the semantic relationship is calculated taking into account the actions performed by the users.

Preferably, the above indicated second relationships are calculated at pre-defined times (for example periodically, with a period that can be changed by configuration) or are calculated in a defined time period (that can be changed by configuration).

The invention is not limited to the above indicated second relationships.

Step 120 includes the assignment of the entities of the second network and corresponding second relationships to at least one of the plurality of display area portions.

The assignment of the entities of the second network to at least one of the display area portions 61, 62, 63, 64 depends on the meaning of the text data or of the images displayed over the four portions 61, 62, 63, 64. In the example in the enogastronomy field with wine Roero Arneis as reference entity, entity $o_2$ is assigned to portion 62 identified by Products because $o_2$ relates to a product according to an action performed by a user (for example, $o_2$ is the name of a person having wine Roero Arneis in the list of his favorites).

Step 135 includes the display, over the display device, of a plurality of images and/or text data for indicating at least part of the entities of the second network assigned to the selected display area portion. Referring to the example in the enogastronomy field, the user of the mobile phone 50 has selected the portion 62 identified by Products and the screen 55 of the mobile phone 50 displays an image representing a cheese which another user has tagged according to the action Tag (or which the other user has commented according to the action Comments).

Step 145 includes the display of at least one text data and/or image describing at least one of the second relationships assigned to the selected display area portion. Referring to the example in the field of enogastronomy and in case the user has selected the image representing the cheese, the screen 55 of the mobile phone 50 displays the following second relationships as text data: "has been tagged by", likes to".

Figure 1C:
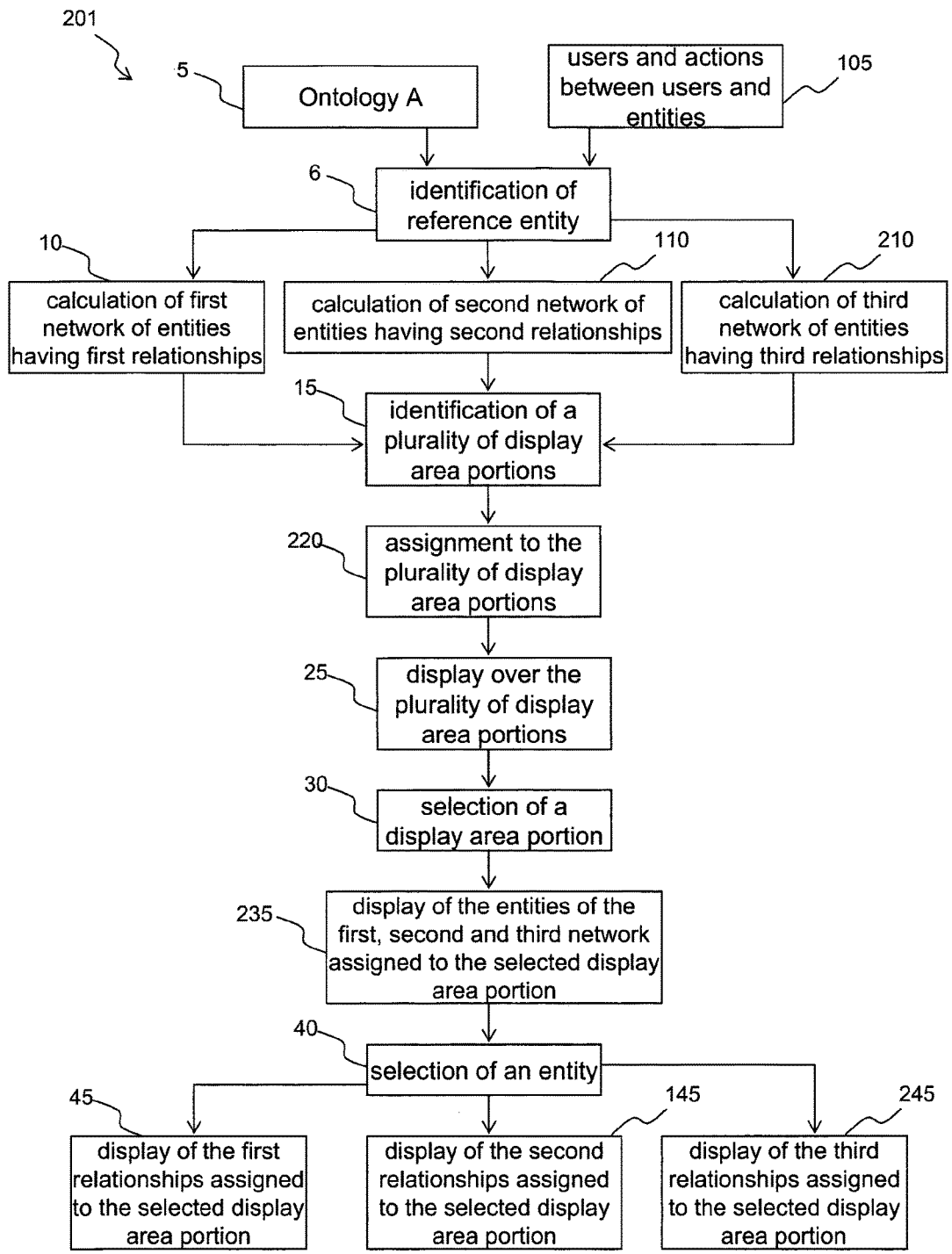

Referring to FIG. 1c, it shows schematically the flowchart of a method 201 for accessing information related to the reference entity according to a third embodiment of the invention, wherein steps with the same function as the second embodiment are indicated with the same reference numbers.

The method 201 includes steps 5, 105, 6, 10, 110, 210, 15, 220, 25, 30, 235, 40, 45, 145, 245.

The method 201 differs from the method 101 in the steps 210, 220, 235, 245.

Step 210 includes the calculation of a third network of entities having third relationships with the reference entity, according to the actions performed by the users and according to the properties of the classes. Said calculation can be referred as Net($o_R$, $o_i$, type=A+Actions), wherein type=A+Actions indicates that the type of calculated third relationships between the reference entity $o_R$ and a generic entity $o_i$ is based both on the ontology A (i.e., on the classes properties) and on the users actions.

Specifically, the following third relationships between the reference entity $o_R$ and an $o_i$ of the ontology A can be calculated, according to the actions performed by the users and according to the properties of the classes of the ontology A:

$o_R$ is used as tag of $o_i$;
$o_R$ is used in the comments of $o_i$;

More in general, third relationships are calculated:

between the reference entity $o_R$ and a class C including a plurality of entities $O=\{o_1, o_2, \ldots o_m\}$, when the reference entity $o_R$ is often used in relation with the entities O, by using the possible actions Vote, Tag, Comment, Add to Favorites;

between two different classes $C_1$, $C_2$, wherein $o_R$ is included into the class $C_1$ or $C_2$, the classes $C_1$, $C_2$ including entities $o1_i$ (i=1, 2, . . . N) and $o2_j$ (j=1, 2 . . . M) respectively, when the entities $o1_i$ are often used in relation with the entities $o1_j$ (i=1, 2, . . . N), by using the possible actions Vote, Tag, Comment, Add to Favorites;

between the reference entity $o_R$ (belonging to class $C_1$) and entities $o2_j$ (j=1, 2, . . . M) belonging to a class $C_2$, when classes $C_1$ and $C_2$ are often in relation each other by using the possible actions Vote, Tag, Comment, Add to Favorites.

Therefore for the purpose of the third embodiment of the present, the third network of entities is a plurality of entities connected by a set of links and having different types of semantic relationships, wherein the semantic relationships are calculated taking into account the properties of the classes and also the actions performed by the users.

The invention is not limited to the above indicated third relationships.

Step 220 includes the assignment of the entities of the third network and corresponding third relationships to at least one of the plurality of display area portions.

The assignment of the entities of the third network to at least one of the display area portions 61, 62, 63, 64 depends on the meaning of the text data or of the images displayed over the four portions 61, 62, 63, 64. In the example in the enogastronomy field with wine Roero Arneis as reference entity, an entity $o_2$ is assigned to portion 62 identified by Products because $o_2$ relates to a product according to the properties of the classes and according to the actions performed by a user (for example, $o_2$ is cheese "Grana Padano", which is included in the list of the tags of the wine Roero Arneis).

Step 235 includes the display, over the display device, of a plurality of images and/or text data for indicating at least part of the entities of the third network assigned to the selected display area portion.

Step 245 includes the display of at least one image and/or text data describing at least one of the third relationships assigned to the selected display area portion. Referring to the example in the field of enogastronomy and in case the user has selected the image representing the cheese, the screen 55 of the mobile phone 50 displays the following third relationship as text data: "is tagged with".

Figure 1D:
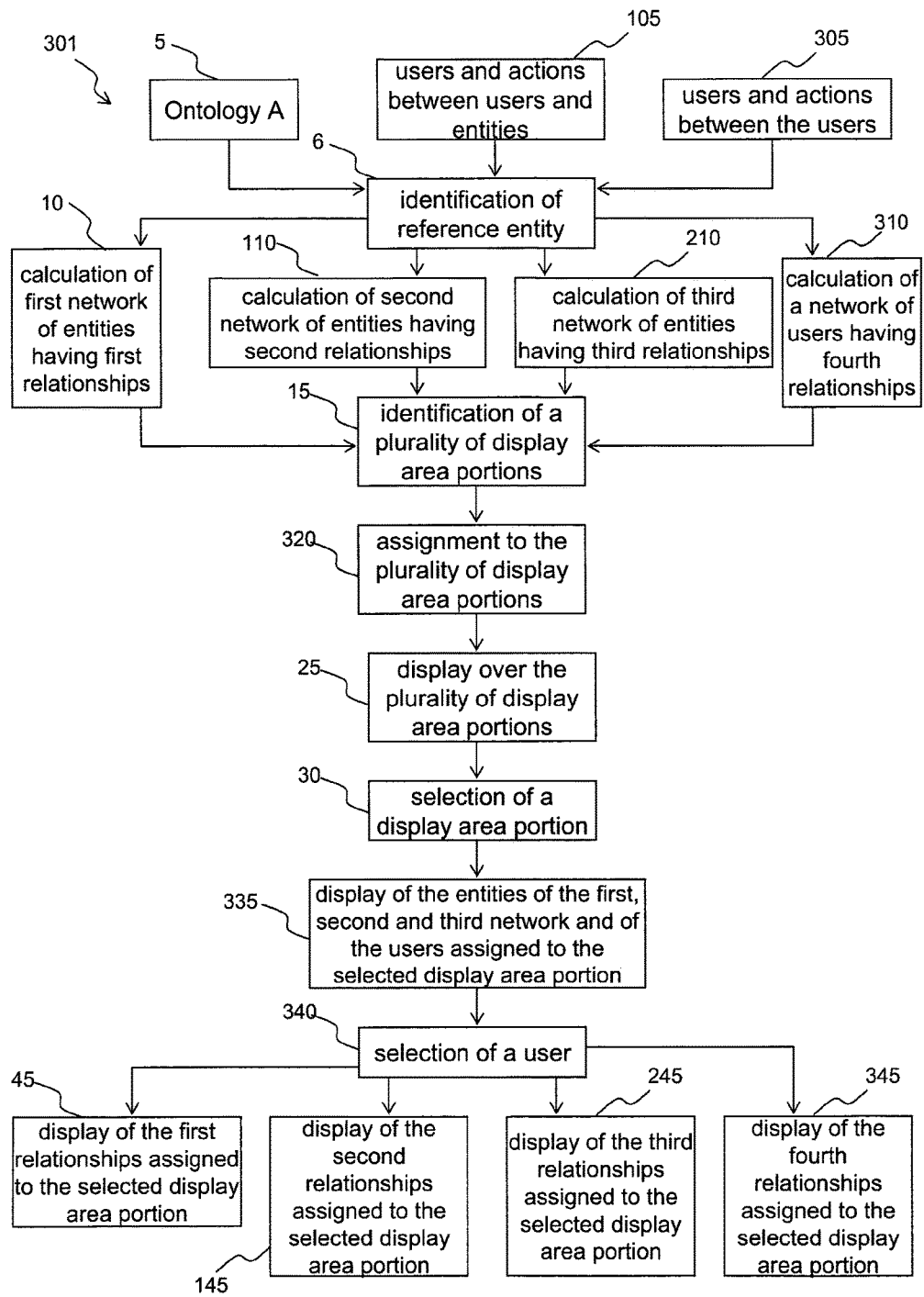

Referring to FIG. 1d, it shows schematically the flowchart of a method 301 for accessing information related to a reference entity according to a fourth embodiment of the invention, wherein steps with the same function as the third embodiment are indicated with the same reference numbers.

The method 301 includes steps 5, 105, 305, 6, 10, 110, 210, 310, 15, 320, 25, 30, 335, 340, 45, 145, 245, 345.

The method 301 differs from the method 201 in the steps 305, 310, 320, 335, 340, 345.

The method 301 is performed by means of a display device, such as the screen 55 of a mobile phone 50, as shown in FIG. 3a.

Step 305 includes providing actions between the users of the plurality of users. The same actions (Vote, Tag, Comment, Add to favorites) described for the second embodiment can also be performed between the users, that is a user can be voted by another user, can be tagged by the other user, can be commented be the other user or can be added to the list of favorites of the other user. Another example of action between the users is the friendship.

Step 310 includes the calculation of fourth relationships between the users of the network of users, according to the actions between the users and/or according to the properties of the classes. Said calculation can be referred as Net($u_i$, $u_j$, type=A+Actions), wherein type=A+Actions indicates that the type of calculated fourth relationships between user $u_i$ and user $u_j$ is based both on the ontology A (i.e., on the classes properties) and on the users actions.

Specifically, the following fourth relationships between the users can be calculated, according to the actions performed by the users and/or according to the properties of the classes:

user $u_1$ is friend of user $u_2$;
users $u_1$ and $u_2$ have at least one equal tag;
users $u_1$ and $u_2$ have at least one equal entity $o_i$ of ontology A in the list of Favorites;
users $u_1$ and $u_2$ have performed actions (Tag, Vote, Comments, Add to Favorites) on a same entity $o_1$ of the ontology A or on a same class $C_i$ of the ontology A.

Preferably, the fourth relationships are calculated at predefined times (for example periodically, with a period that can be changed by configuration) or are calculated in a defined time period (that can be changed by configuration).

The invention is not limited to the above indicated fourth relationships.

Step 320 includes the assignment of the users of the user network and corresponding fourth relationships to at least one of the plurality of display area portions.

The assignment of the users of the user network to at least one of the display area portions 61, 62, 63, 64 depends on the meaning of the text data or of the images displayed over the four portions 61, 62, 63, 64.

Step 335 includes the display of a plurality of images and/or text data for indicating at least part of the users assigned to the selected display area portion.

Step 340 includes the selection of a user selected from the user network.

Step 345 includes the display of a plurality of images and/or text data describing at least one of the fourth relationships assigned to the selected display area portion.

According to a variant (not shown in the drawings) of the method according to the second, third and fourth embodiments of the invention, fifth relationships can be calculated between the reference entity $o_R$ and a user $u_i$ selected from the plurality of users U, taking into account:

the ontology A (i.e., the classes properties); or
the actions performed by the user $u_i$; or
both the ontology A (i.e., the classes properties) and the actions performed by the user $u_i$.

Specifically, the following fifth relationships between the reference entity $o_R$ and the user $u_i$ can be calculated:

user $u_i$ is an expert of the reference entity $o_R$;
user $u_i$ has performed some actions (Tag, Comments, Vote, Add to Favorites) on the reference entity $o_R$. An example of this relationship in the enogastronomy field is when the reference entity $o_R$ is the name of a restaurant and a user $u_1$ can display the comments provided by another user $u_2$ (for example, a friend) about this restaurant;
user $u_i$ who has the reference entity $o_R$ included in the list of his favorite entities;
user $u_i$ who has the reference entity $o_R$ included in the list of his entities who had access recently;
user $u_i$ and the reference entity $o_R$ which the user $u_i$ has often mentioned in the comments about $o_R$;
user $u_i$ and the reference entity $o_R$ which the user $u_i$ has often mentioned in the description of the same user $u_i$.

According to another variant (not shown in the drawings), the methods according to the first, second, third and fourth embodiments of the invention further includes the step of providing another ontology L describing a second plurality of entities, said second plurality of entities being another plurality of classes of the other ontology L or being instances arranged into another plurality of classes, said other plurality of classes having respective other properties. For example, in the field of enogastronomy another ontology L can be in the field of geography and the other entities can describe geographical places and their properties. This other ontology allows calculating further relationships, such as between entities belonging to the different ontologies A and L.

The method according to the other variant further includes the step of calculating a sixth network of entities selected from the second plurality of entities, wherein the entities of the sixth network have sixth relationships with the reference entity (and, preferably, each other), according to said other properties.

The method according to the other variant further includes the step of assigning the entities of the second network and corresponding sixth relationships to at least one of the plurality of display area portions.

The method according to the other variant further includes the step of displaying a plurality of images and/or text data for indicating at least part of the entities of the sixth network of entities assigned to the selected display area portion.

Figure 2:
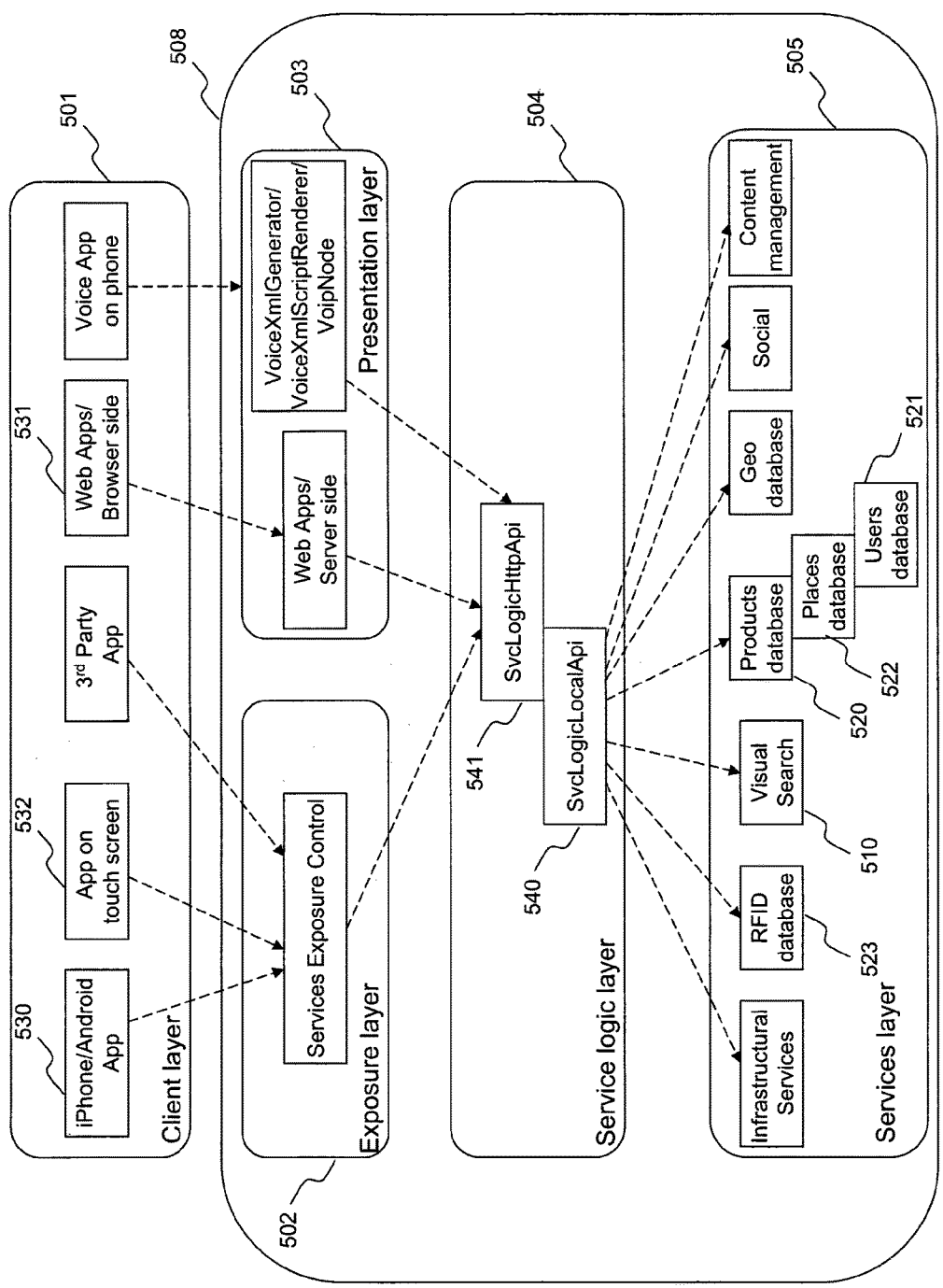
FIG. 2 schematically shows a system for accessing information related to a reference entity according to the invention.

Referring to FIG. 2, it shows schematically a system 500 for accessing information related to a reference entity or to a reference user.

The system 500 operates according to a client-server architecture including a plurality of layers, wherein each layer is connected with the adjacent layers.

The system 500 includes a Client layer 501 and a Server layer 508; preferably, the Client layer 501 is connected to the Server layer 508 through a telecommunications network (which is not shown in FIG. 2).

The Server layer 508 includes:
an Exposure layer 502;
a Presentation layer 503;
a Service logic layer 504;
a Services layer 505.

The Server layer 508 is implemented for example by server equipment. The client layer 501 is implemented for example by the mobile phone 50 (a smart phone or the like, such as an iPhone™) or by a Personal Computer, notebook, netbook or the like.

The client layer 501 transmits messages to the server layer 508 for indicating requests of information related to the reference entity $o_R$ or requests of information related to a user $u_i$ of the plurality of users U, and receives back from the server layer 508 answer messages carrying the information related to the reference entity $o_R$ or to the user $u_i$.

The client layer 501 performs the steps 30, 35, 40, 45 of the method 1 according to the first embodiment of the invention and performs the steps 30, 135, 40, 45, 145 of the method 101 according to the second embodiment of the invention. Therefore the client layer 501 is configured for selecting a display area portion out of the plurality of display area portions, and is configured for displaying, over the display device, a plurality of images and/or text data for indicating at least part of the entities of the first network assigned to the selected display area portion.

In case the client layer 501 is implemented by a mobile phone, it includes a processor running an application 530 implemented with a software program, which performs the steps 30, 35, 40, 45 of the method 1 according to the first embodiment of the invention and the steps 30, 135, 40, 45, 145 of the method 101 according to the second embodiment of the invention.

Preferably, in case the client layer 501 is implemented by a Personal Computer, it includes a web browser application 531 which performs the steps 30, 35, 40, 45 of the method 1 according to the first embodiment of the invention and the steps 30, 135, 40, 45, 145 of the method 101 according to the second embodiment of the invention.

Preferably, in case the client layer 501 is implemented by a Personal Computer including a touch screen or by an iPad, it includes an application 532 which performs the steps 30, 35, 40, 45 of the method 1 according to the first embodiment of the invention and the steps 30, 135, 40, 45, 145 of the method 101 according to the second embodiment of the invention.

The Services layer 505 has the function to provide a plurality of services.

The Services layer 505 includes a database 520 (such as a relational database) configured for storing the ontology A describing the first plurality of entities; preferably, the database 520 is stored into a non-volatile memory.

Preferably, the Services layer 505 includes another database 521 configured for storing the information related to the actions performed by the plurality of users U; preferably, the database 521 is stored into another non-volatile memory.

Preferably, the Services layer 505 includes another database 522 configured for storing the ontology L describing the second plurality of entities; preferably, the database 522 is stored into another non-volatile memory.

Preferably, the Services layer 505 includes another database 523 configured for storing the list of the first plurality of entities and the corresponding. RFID identifiers; preferably, the database 523 is stored into another non-volatile memory.

The Services layer 505 includes a module 510 configured for identifying the reference entity $o_R$ by means of information (for example, a photo) generated from a visual search.

The Service logic layer 504 includes a module 540 which has the function to elaborate the request messages generated by the client layer 501, to send request query messages (for example, using SQL or SPARQL) to the Services layer 505, to receive back from the Services layer 505 answers query messages and to send the answer messages towards the Client layer.

The module 540 is configured for calculating the first network of entities selected from the first plurality of entities, said entities of the first network having first relationships with the reference entity, according to the properties of the classes. The module 540 is further configured for identifying a plurality of portions available on the area of a display device, according to the plurality of classes of the ontology, and is configured for assigning the entities of the first network to at least one of the plurality of display area portions. The module 540 is implemented for example with Java, running on a processor included into the server equipment.

The Service logic layer 504 further includes a module 541 performing interface functionalities, implemented with JSON (Java Script Object Notation) or XML over http.

The Presentation layer 503 performs the functions required to generate the user interfaces for the browser and for voice applications.

The Exposure layer 502 has the function to control the access to the API HTTP provided by the Service Logic layer 504, in order to provide a safe access and an access which can also be monitored.

Advantageously, the shape of the identified area of the screen 55 of the mobile phone 50 is substantially a circle, as shown schematically in FIG. 4a, and the portions of the screen are sectors of the circle.

Referring to FIGS. 3a-b, 4a-h, 5a-b, 6a-d, it will be explained hereinafter the operation of a mobile phone 50 performing the methods 1 and 101 according to the first and second embodiments of the invention in order to access information related to a reference entity by means of a display device, wherein the reference entity is the name of a wine named "Roero Arneis" and the display device is the screen 55 of the mobile phone 50.

In order to explain the operation, it is supposed that the display device is the screen 55 of a mobile phone 50 (for example, a smart phone or the like, such as an iPhone™), but the invention is not limited to the screen of the mobile phone; for example, the display device can be the screen of a Personal Computer or the screen of an iPad.

It is also supposed that the screen 55 of the mobile phone 50 is a touch screen, that is the screen 55 detects the presence and location of a touch (such as a finger) within the display area and the user can interact directly with what is displayed on the screen. Anyway, the invention is not limited to a touch screen: for example, the user can interact with the cursor of a mouse or of a touchpad.

It is also supposed that the ontology A describes the field of enogastronomy. Anyway, the invention can be applied to an ontology describing other fields, such as books, music, films.

At a starting time $t_0$ the user $u_1$ of the mobile phone 50 is interested to access information related to a bottle of wine 52 and focus the camera of the mobile phone 50 on the label 53 of the bottle 52, as shown in FIG. 3a. The user $u_1$ touches with the finger the area 54 of the screen 55 and the camera takes a photo of the label 53. The mobile phone 50, by means of suitable hardware devices and a software program running in the mobile phone 50, recognizes the bottle of wine 52 Roero Arneis and identifies that the reference entity $o_R$ of the ontology A is the bottle of wine 52 named Roero Arneis.

In case the mobile phone 50 recognizes more than one product, the screen 55 displays a list with a plurality of products, for example each one with a photo and a corresponding short description (for example, "Roero Arneis by Pino Costalunga", "Roero Arneis by Gianni Casetta", "Roero Arneis by brothers Rabbino"), and the user can select one of them by touching the screen 55 in the area corresponding to the interested product.

Therefore at time $t_0$ it's performed the step 6 of the methods 1 and 101 according to the first and second embodiments of the invention and the reference entity $o_R$ is the bottle of wine 52 named Roero Arneis.

At time $t_1$ (subsequent to time $t_0$) the screen 55 displays the possible actions which can be performed by the user $u_1$ on the bottle of wine 52 Roero Arneis, and the possible actions (see FIG. 3*b*) are:

Vote: by touching the area 56, the user $u_1$ can assign a vote to the bottle of wine 52 Roero Arneis, as shown in FIG. 6*a*. The user $u_1$ can assign a vote comprised between 1 and 5 by touching a corresponding number of stars comprised between 1 and 5 in the area 80 (in the example of FIG. 6*a*, the user assigns the vote equal to 1, which is represented by one star filled with black); afterwards, the user $u_1$ can touch the area 81 to confirm the vote or can touch the area 82 to cancel the vote. Preferably, the screen 55 displays an area 83 indicating an average of the votes previously assigned by other users (three stars—which are filled with black—in the example of FIG. 6*a*);

Tag: by touching the area 57, the user $u_1$ can assign a tag to the bottle of wine 52 Roero Arneis, as shown in FIG. 6*b*. The user $u_1$ can add a word (good) in the area 84 and can assign it as the tag by touching the area 85. Preferably, the screen 55 displays the tags (white, fish, light) previously assigned by other users and the user $u_1$ can also select one of these tags by touching the tags in the corresponding area of the screen 55 and confirm the selected tag by touching the area 85;

Comments: by touching the area 58, the user $u_1$ can assign some comments to the bottle of wine 52 Roero Arneis, as shown in FIG. 6*c*. The user $u_i$ can type the comments in the area 86 by touching the letters on the screen 55 and afterwards the user $u_1$ can touch the area 87 to confirm the comments;

Add to Favorites: by touching the area 59, the user can $u_i$ assign the bottle of wine 52 Roero Arneis to the list of his/her favorites entities, as shown in FIG. 6*d*. The screen 55 displays in the area 88 a message asking the user if to add the bottle of wine 52 Roero Arneis to the favorites and the user $u_i$ can confirm it by touching the area 89. Preferably, the screen 55 displays the number of users (20) having the bottle of wine 52 Roero Arneis in the list of their favorites.

Therefore at time $t_1$ it's performed part of the step 105 of the method 1 according to the second embodiment of the invention.

Moreover, by touching the area 51 indicated with text data "Put in the centre", the user $u_1$ can decide to put the bottle of wine 52 Roero Arneis in the centre, meaning that the user $u_1$ is interested to access further information related to the bottle of wine 52 Roero Arneis.

At time $t_2$ (subsequent to time $t_1$) the user $u_1$ touches with the finger the area 51 of the screen 55 and the screen 55 displays an image representing a wheel 60 divided into four sectors 61, 62, 63, 64, as shown in FIG. 4*a*. Moreover, the four sectors 61, 62, 63, 64 displays the following text data respectively People, Products, Places, Cooking. Moreover, the wheel 60 shows in the centre 65 a small image representing the bottle of wine 52 Roero Arneis, which is schematically represented in FIG. 4*a* with the reference entity $o_R$, which is the bottle of wine 52 Roero Arneis.

Therefore at time $t_2$ are performed the steps 15 and 25 of the method 1 and 101 according to the first and second embodiments of the invention.

The shape of the wheel divided into four sectors has the advantage to allow to represent at the same time on a plane with a limited area (such as the screen 55 of a mobile phone) a huge amount of information having semantic relationships with the reference entity, wherein said information can be retrieved not only from the static information arranged into one or more ontologies, but also from information dynamically generated from the actions (such as Vote, Tag, Comments, Add to Favorites) performed by the plurality of users U. Moreover, the limited number of sectors of the wheel allows access to the information with a limited number of commands, thus the access is performed in a simple way.

Figure 4C:
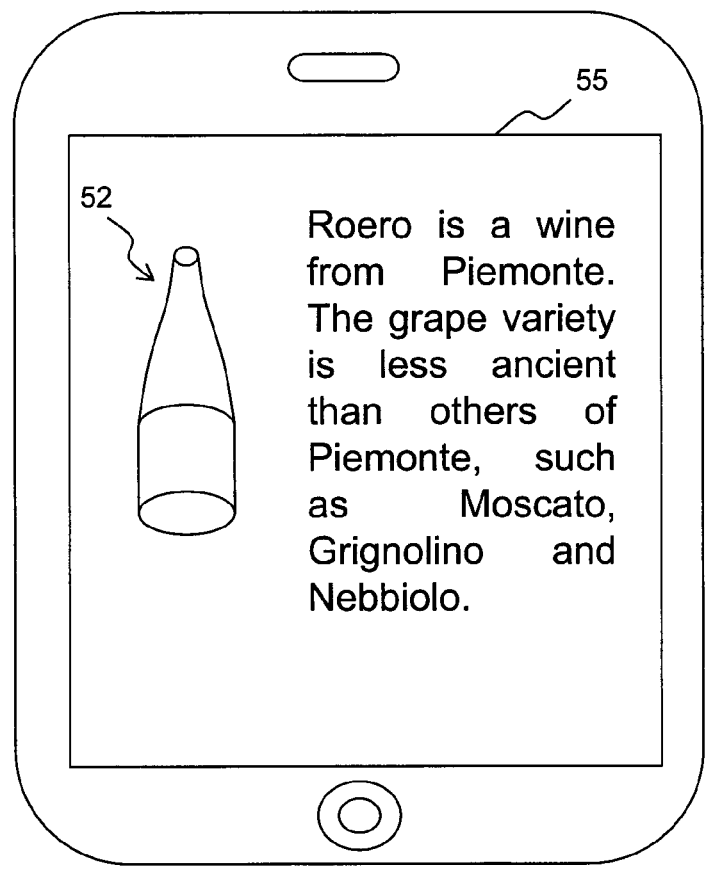

At time $t_3$ (subsequent to time $t_2$) the user $u_1$ touches with the finger the area 65 in the centre of the wheel 60 and the screen 55 displays on the left a small image representing the bottle of wine 52 Roero Arneis and displays on the right a description of the bottle of wine 52 Roero Arneis, as shown schematically in FIG. 4*c*.

At time $t_3$ (subsequent to time $t_2$) the user $u_1$ is interested to access products related to the bottle of wine 52 Roero Arneis and touches with the finger the sector 62 indicating Products: this performs the step 30 of the method 1 according to the first embodiment of the invention.

The screen 55 displays the products assigned (by the step 20 of the method 1) to the sector 62 (Products), as shown schematically in FIG. 4*b*. Specifically, the screen 55 displays the products of the ontology A related to the bottle of wine 52 Roero Arneis: the products are indicated by the image 71 representing a small bottle of wine Grignolino, the image 72 representing a small bottle of wine Moscato and the image 73 representing the cheese "Grana Padano". Therefore at time $t_4$ are performed the steps 35 and 135 of the method 1 and 101 according to the first and second embodiments of the invention, wherein the entities $o_2$, $o_5$, $o_9$ of the first network correspond to a small bottle of wine Grignolino, a small bottle of wine Moscato and the cheese "Grana Padano" respectively.

Preferably, the screen 55 displays areas 90, 91, 92 for filtering the entities assigned to the selected sector and the filters are activated by touching with the finger the corresponding areas 90, 91, 92. In the example in the field of enogastronomy, the areas 90, 91, 92 indicate the following text data respectively: Slow food, Km0, Interest. The Slow food filter, when activated, displays within the portion 62 only the entities of having the slow food property. The Km0 filter, when activated, displays within the portion 62 only the entities which are located near the reference entity, which is the entities which have a geographical relationship with the reference entity.

Preferably, at time $t_3$ the user $u_1$ can touch with the finger the area 65 in the centre of the wheel 60 and the screen 55 displays on the left a small image representing the bottle of wine 52 Roero Arneis and displays on the right a description of the bottle of wine 52 Roero Arneis, as shown schematically in FIG. 4*c*.

At time $t_4$ (subsequent to time $t_3$) the user $u_1$ touches quickly two times with the finger the image 72 representing the small bottle of wine Moscato and the screen 55 displays an area 70 including a plurality of text data describing the relationships $r_5$, $r_i$, $r_j$ (calculated by the steps 10 and 110 of the methods 1 and 101) between the small bottle of wine Moscato and other entities of the ontology A or between the small bottle of wine Moscato and other users U, as shown in FIG. 4*e*: this performs the step 45 and 145 of the method 1 and 101 according to the first and second embodiments of the invention. Specifically, the displayed relationship $r_5$ is "is similar to", the displayed relationship $r_i$ is "is produced by" and the displayed relationship $r_j$ is "is served by".

Figure 4D:
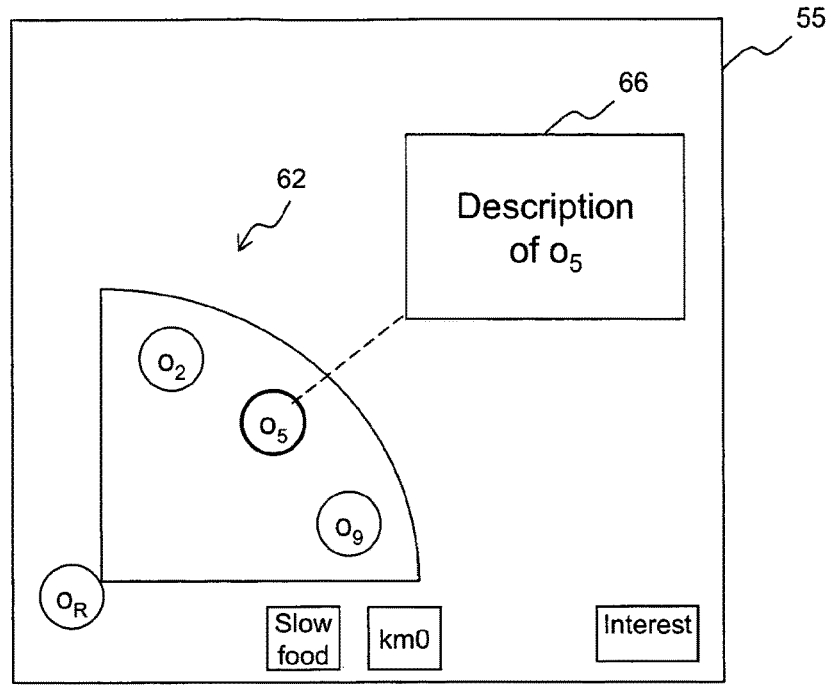
Figure 4E:
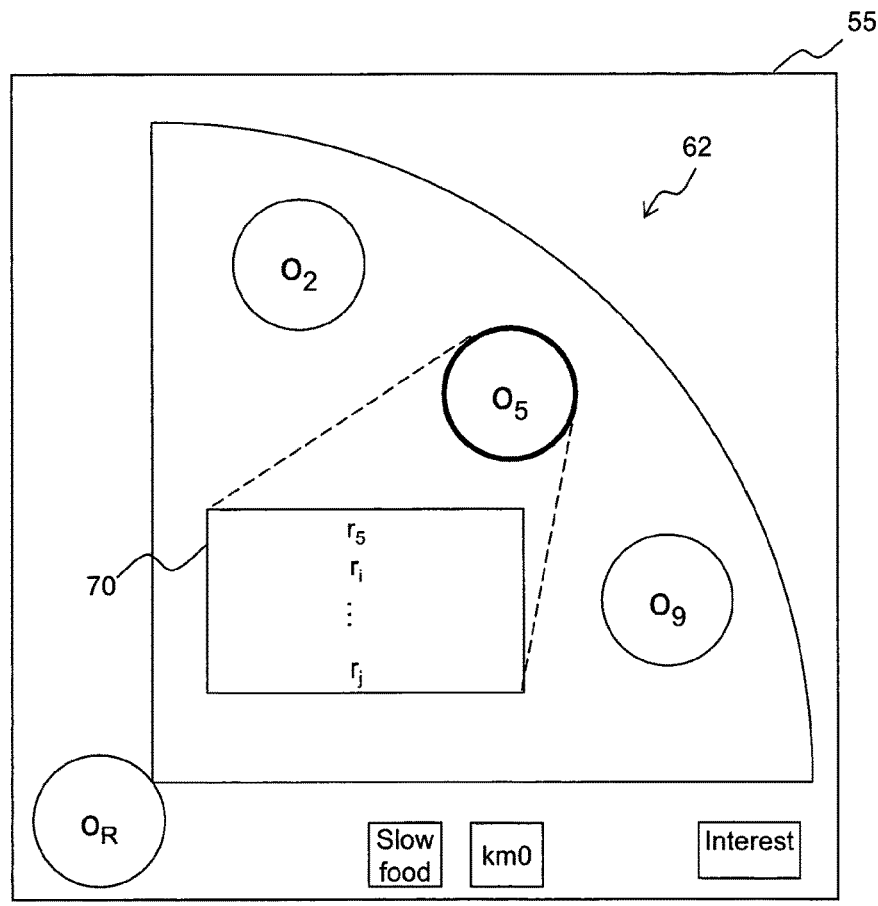

Preferably, at time $t_4$ the user $u_1$ touches one time with the finger the image 72 representing the small bottle of wine Moscato and the screen 55 displays an area 66 including a description of wine Moscato, as shown in FIG. 4*d*.

Preferably, at time $t_4$ (subsequent to time $t_3$) the user $u_1$ can be interested to check if there are other products (different from the ones indicated by the images 71, 72, 73) of the ontology A related to the bottle of wine 52 Roero Arneis. The user $u_1$ can touch the screen 55 and rotates the finger, as shown with line 76 in FIG. 4g (in other words, the wheel 60 can be scrolled). The screen 55 displays other two products indicated by the images 74 and 75 representing the entities $o_{11}$ and $o_{13}$ respectively (see FIG. 4h), which were assigned (in step 20) to the portion 62.

Figure 4F:
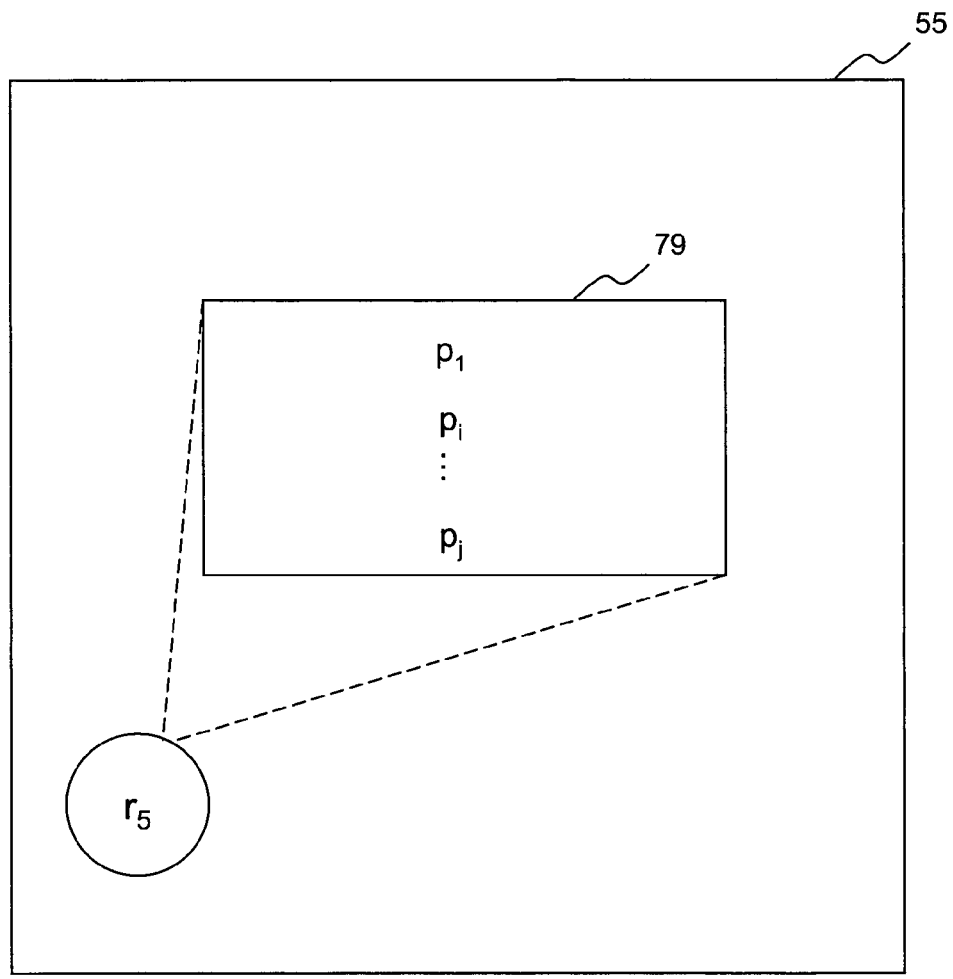
Figure 4G:
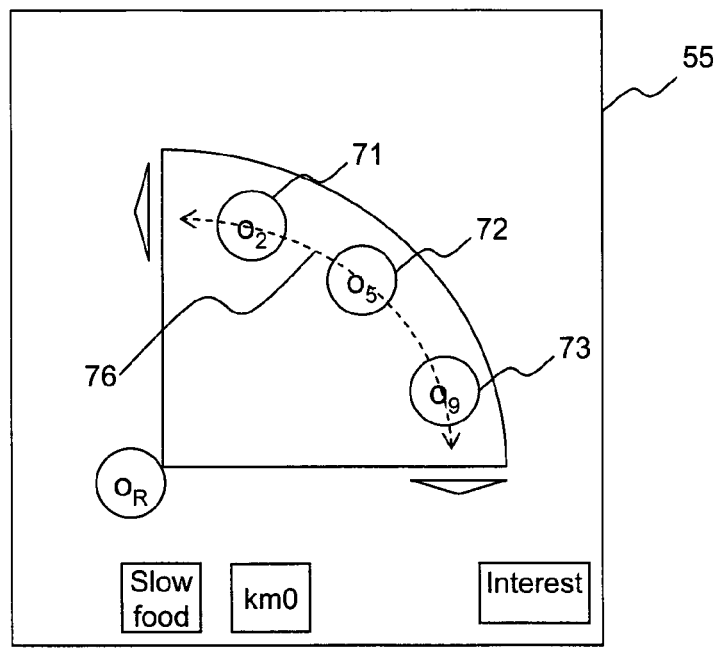
Figure 4H:
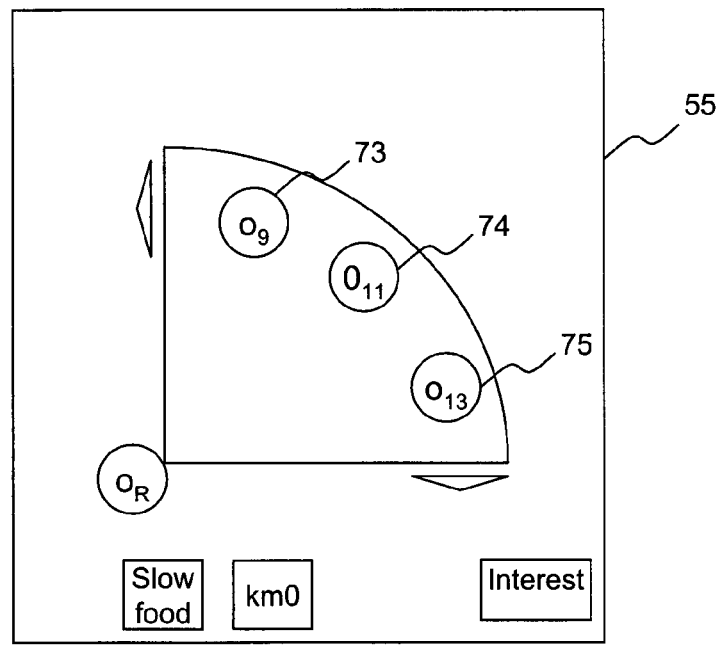

At time $t_5$ (subsequent to time $t_4$) the user $u_1$ touches with the finger the area of the screen 55 displaying the relationship $r_5$ "is similar to" and the screen 55 displays more in detail the relationship $r_5$ "is similar to", as shown in FIG. 4f. Specifically, the screen 55 displays an area 79 indicating a list $p_1, p_i, \ldots p_j$ of specific relationships "is similar to", which are for example the following: $p_1$=Roero Arneis, $p_i$=Grignolino, ... $p_j$=Nebbiolo. Therefore the user $u_1$ retrieves the list of products which are similar to the wine Moscato, which is wines Roero Arneis, Grignolino and Nebbiolo.

Figure 5A:
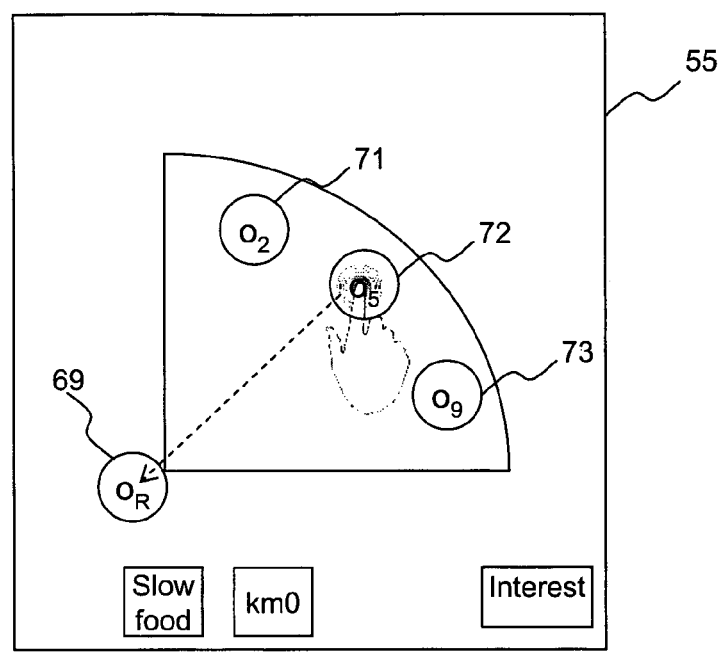
FIGS. 5*a-b* schematically show the drag and drop step of the method according to the invention.
Figure 5B:
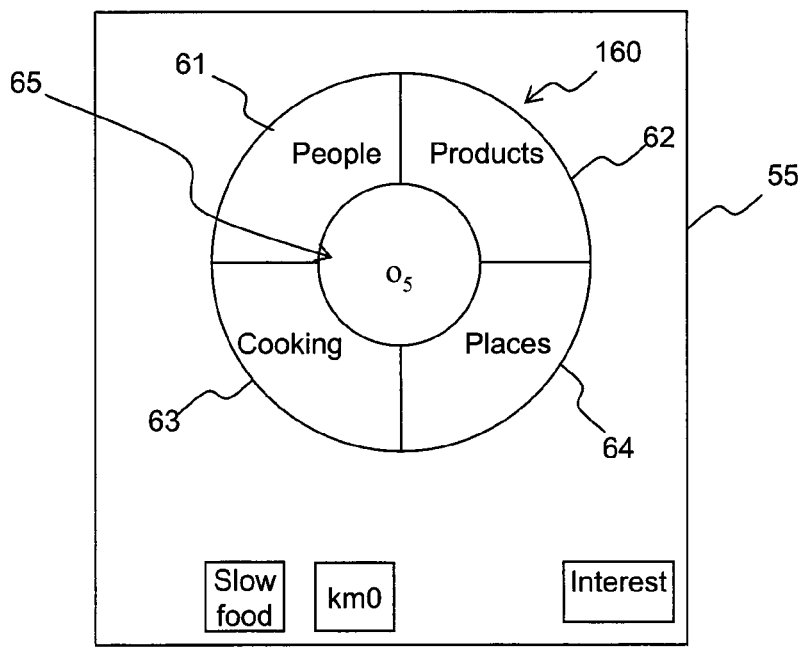

At time $t_6$ (subsequent to time $t_5$) the user $u_1$ touches with the finger the image 72 (corresponding to entity $o_5$), drags and drops it into the area 69, as shown in FIG. 5a. The screen 55 displays a wheel 160 at least in part different from the wheel 60, as shown in FIG. 5b. The wheel 160 has in the centre 65 a small image representing the entity $o_5$ (in the example, a bottle of wine Moscato). Moreover, the wheel 160 is divided into the four sectors 61, 62, 63, 64, displaying the following text data respectively: People, Products, Cooking, Places.

It is worth noting that the text data (and/or images) displayed on the four sectors 61, 62, 63, 64 of the wheel 160 can also be different (at least in part) from the text data (and/or images) displayed on the four sectors 61, 62, 63, 64 of the wheel 60, because it depends on the semantic of the reference entity $o_R$ which is placed in the centre 65 of the wheel 160.

It is also worth noting that the operation of the mobile phone 50 according to the invention can also start (time $t_0$) from any entity $o_i$ selected from the plurality of entities O, or can start from any user $u_i$ selected from the plurality of users U: in this last case the user $u_i$ is interested to access information having a relationship with at least part of the plurality of entities O and having a relationship with another $u_j$, wherein the information can be retrieved not only from the static information arranged into one or more ontologies, but also from information dynamically generated from the actions (such as Vote, Tag, Comments, Add to Favorites) performed by the plurality of users U.

Preferably, the methods according to the invention further include the step of generating a user model according to the actions performed by the user. For example, the user model describes the interests of the user for different classes of the ontology or his favorite entities. In case of performing the invention by means of the screen 55 of the mobile phone 50, the user model can be activated by touching with the finger the screen area 92, as shown in FIG. 4a. In this case the methods 1 and 101 further include, between the steps 30 and 35 and between 30 and 135, the step of filtering the entities of the first and second network, according to the generated user model, and the steps 35 and 135 display only the entities which fulfill the requirements of the user model.

The invention claimed is:

1. A method comprising:
    providing an ontology describing a reference entity and a first plurality of entities, the reference entity and the first plurality of entities being a plurality of classes of the ontology or being arranged into a plurality of classes, each of said plurality of classes having respective properties;
    providing data indicative of a plurality of users and at least one action between one or more of the plurality of users and the reference entity and between one or more of the plurality of users and at least part of the first plurality of entities, wherein the at least one action comprises at least one of a vote, a comment, or an add to favorites for one or more of the reference entity or one or more of the at least part of the first plurality of entities;
    receiving information indicating a user selection of a single reference entity;
    calculating, out of the first plurality of entities, entities of a first network having first relationships with the single reference entity, according to said properties;
    calculating, out of the first plurality of entities, entities of a second network having second relationships with the single reference entity, according to the at least one action;
    identifying a plurality of display area portions available on an area of a display of a mobile device with a limited display area, according to the plurality of classes of the ontology;
    assigning the entities of the first network and corresponding first relationships to a first one or more of the plurality of display area portions;
    assigning the entities of the second network and corresponding actions to a second one or more of the plurality of display area portions;
    displaying, on the display of the mobile device, the entities of the first network assigned to the first one or more of the plurality of display area portions, and displaying at least one of image or text data describing one or more of the first relationships assigned to the first one or more of the plurality of display area portions; and
    displaying, on the display of the mobile device and contemporaneously with the display of the entities of the first network assigned to the first one or more of the plurality of display area portions, the entities of the second network and corresponding actions assigned to the second one or more of the plurality of display area portions.

2. The method according to claim 1, further comprising:
    calculating entities of a third network having third relationships with the single reference entity, according to the at least one action and to said properties;
    assigning the entities of the third network to a third one or more of the plurality of display area portions; and
    displaying, on the display of the mobile device, at least part of the entities of the third network assigned to the third one or more of the plurality of display area portions.

3. The method according to claim 1, further comprising:
    providing at least one action between the users of the plurality of users;
    calculating a network of users and third relationships between the users of the network of users, according to the at least one action between the users or said properties;
    assigning the users of the network of users to at least one of the plurality of display area portions; and displaying a plurality of images or text data for indicating at least part of the users assigned to the at least one of the plurality of display area portions.

4. The method according to claim 1, further comprising:
calculating third relationships between the single reference entity and the users of a network of users, according to said properties or said at least one action;
assigning the users of the network of users to at least one of the plurality of display area portions; and
displaying a plurality of images or text data for indicating at least part of the users assigned to the at least one of the plurality of display area portions.

5. The method according to claim 1, further comprising:
providing a second ontology describing a second plurality of entities, said second plurality of entities being another plurality of classes of the second ontology or being arranged into another plurality of classes, said another plurality of classes having respective other properties;
calculating, out of the second plurality of entities, a third network of entities having second relationships with the single reference entity, according to said other properties;
assigning the entities of the third network to at least one of the plurality of display area portions; and
displaying at least part of the entities of the third network of entities assigned to the at least one of the plurality of display area portions.

6. The method according to claim 1, further including:
selecting an entity out of the entities of the first network; and
displaying at least one image or text data describing at least one of the first relationships assigned to the first one or more of the plurality of display area portions.

7. The method according to claim 6, wherein:
the assigning the entities of the second network comprises assigning the entities of the second network and corresponding second relationships to the second one or more of the plurality of display area portions,
the selecting includes selecting an entity out of the entities of the second network; and
the displaying the at least one image or text data includes displaying at least one image or text data describing at least one of the second relationships assigned to the second one or more of the plurality of display area portions.

8. The method according to claim 6, further comprising:
calculating a third network of entities having third relationships with the single reference entity, according to the at least one action and to said properties;
assigning the entities of the third network to a third one or more of the plurality of display area portions; and
displaying, on the display of the mobile device, at least part of the entities of the third network assigned to the third one or more of the plurality of display area portions, wherein:
the assigning the entities of the third network includes assigning the entities of the third network and corresponding third relationships to the third one or more of the plurality of display area portions;
the selecting includes selecting an entity out of the third network of entities; and
the displaying the at least one image or text data includes displaying at least one image or text data describing at least one of the third relationships assigned to the third one or more of the plurality of display area portions.

9. The method according to claim 6, further comprising:
providing at least one action between the users of the plurality of users;
calculating a network of users and third relationships between the users of the network of users, according to the at least one action between the users or said properties;
assigning the users of the network of users to at least one of the plurality of display area portions; and
displaying a plurality of images or text data for indicating at least part of the users assigned to the at least one of the plurality of display area portions;
the assigning the users includes assigning the users and corresponding fourth relationships to at least one of the plurality of display area portions;
the selecting includes selecting a user out of the network of users; and
the displaying the at least one image or text data includes displaying at least one image or text data describing at least one of the fourth relationships assigned to the at least one of the plurality of display area portions.

10. The method according to claim 1, wherein the mobile device comprises a mobile phone including a processor, and wherein the mobile phone is configured to perform the displaying the entities of the first network assigned to the first one or more of the plurality of display area portions and the displaying the entities of the second network and corresponding actions assigned to the second one or more of the plurality of display area portions.

11. The method according to claim 1, wherein the information indicating the user selection of the single reference entity comprises one or more of:
an image of the single reference entity captured by a camera, or information from a radio-frequency identifier associated with the single reference entity.

12. The method according to claim 1, further comprising:
receiving a second user selection of one of the entities of the first network displayed on the display of the mobile device, wherein the one of the entities of the first network corresponds to an entity from the entities of the first network; and
in response to receiving the second user selection, assigning the entity from the entities of the first network as the single reference entity.

13. The method according to claim 1, further comprising:
displaying, on the display of the mobile device, at a first display area portion of the plurality of display area portions, and contemporaneously with the display of the entities of the first network assigned to the first one or more of the plurality of display area portions, the single reference entity;
receiving a second user selection of one of the entities of the second network contemporaneously displayed with the display of the entities of the first network; and
in response to receiving the second user selection:
assigning the one of the entities of the second network as a new reference entity; and
displaying, on the display of the mobile device and at the first display area portion of the plurality of display area portions, the new reference entity.

14. A method comprising:
providing an ontology describing a plurality of entities;
providing data indicative of a plurality of users and at least one action between one or more of the plurality of users and at least part of the plurality of entities, wherein the at least one action comprises at least one of a vote, a comment, or an add to favorites for one or more of the at least part of the plurality of entities;

receiving information indicating a user selection of a single reference user;
calculating, out of the plurality of entities, entities of a first network having first relationships with the single reference user, according to the ontology;
calculating, out of the plurality of entities, entities of a second network having second relationships with the single reference user, according to the at least one action;
identifying a plurality of display area portions available on an area of a display of a mobile device with a limited display area;
assigning the entities of the first network and corresponding first relationships to a first one or more of the plurality of display area portions;
assigning the entities of the second network and corresponding actions to a second one or more of the plurality of display area portions;
displaying, on the display of the mobile device, the entities of the first network assigned to the first one or more of the plurality of display area portions, and displaying at least one of image or text data describing one or more of the first relationships assigned to the first one or more of the plurality of display area portions; and
displaying, on the display of the mobile device and contemporaneously with the display of the entities of the first network assigned to the first one or more of the plurality of display area portions, the entities of the second network and corresponding actions assigned to the second one or more of the plurality of display area portions.

15. The method according to claim 14, further comprising displaying at least a second part of the entities of the second network assigned to the second one or more of the plurality of display area portions replacing the entities of the second network, wherein the at least the second part of the entities of the second network is different from the entities of the second network.

16. The method according to claim 14, wherein a shape of the area of the display of the mobile device is substantially a circle and the display area portions are different parts of the circle.

17. The method according to claim 14, wherein the entities of the ontology are instances or classes.

18. A server device comprising:
a database configured for storing an ontology describing a first plurality of entities, the first plurality of entities being a plurality of classes of the ontology or being arranged into a plurality of classes, each of said plurality of classes having respective properties;
another database configured for storing data indicative of a plurality of users and at least one action between one or more of the plurality of users and at least part of the first plurality of entities, wherein the at least one action comprises at least one of a vote, a comment, or an add to favorites for one or more of the at least part of the first plurality of entities;
a processor; and
a module that, when run on the processor, causes the server device to:
receive information indicating a user selection of a single reference entity out of the first plurality of entities;
calculate, out of the first plurality of entities, entities of a first network having first relationships with the single reference entity, according to said properties;
calculate, out of the first plurality of entities, entities of a second network having second relationships with the single reference entity, according to the at least one action;
identify a plurality of display area portions available on an area of a display of a mobile device with a limited display area, according to the plurality of classes of the ontology;
assign the entities of the first network and corresponding first relationships to a first one or more of the plurality of display area portions;
assign the entities of the second network and corresponding actions to a second one or more of the plurality of display area portions;
transmit, to the mobile device, one or more messages instructing the mobile device to:
display, on the display of the mobile device, the entities of the first network assigned to the first one or more of the plurality of display area portions, and display at least one of image or text data describing one or more of the first relationships assigned to the first one or more of the plurality of display area portions; and
display, on the display of the mobile device and contemporaneously with the display of the entities of the first network assigned to the first one or more of the plurality of display area portions, the entities of the second network and corresponding actions assigned to the second one or more of the plurality of display area portions.

19. A server device including:
a database configured for storing an ontology describing a plurality of entities;
another database configured for storing information of a plurality of users and information of at least one action between one or more of the plurality of users and at least part of the plurality of entities, wherein the at least one action comprises at least one of a vote, a comment, or an add to favorites for one or more of the at least part of the plurality of entities;
a processor; and
a module that, when run on the processor, causes the server device to:
receive information indicating a user selection of a single reference user out of the plurality of users;
calculate, out of the plurality of entities, entities of a first network having first relationships with the single reference user, according to the ontology;
calculate, out of the plurality of entities, entities of a second network having second relationships with the single reference user, according to the at least one action;
identify a plurality of display area portions available on an area of a display of a mobile device with a limited display area;
assign the entities of the first network and corresponding first relationships to a first one or more of the plurality of display area portions;
assign the entities of the second network and corresponding actions to a second one or more of the plurality of display area portions;
transmit, to the mobile device, one or more messages instructing the mobile device to:
display, on the display of the mobile device, the entities of the first network assigned to the first one or more of the plurality of display area portions, and display at least one of image or text data describing one or more of the first relationships assigned to the first one or more of the plurality of display area portions; and display, on the display of the mobile device and contemporaneously with the display of the entities of the first network assigned to the first one or more of the plurality of display area portions, the entities of the second network and corresponding actions assigned to the second one or more of the plurality of display area portions.

\* \* \* \* \*